United States Patent
Chuang

(10) Patent No.: US 9,503,672 B2
(45) Date of Patent: Nov. 22, 2016

(54) DISPLAY MODULE HAVING STRENGTHENED STRUCTURE

(71) Applicant: AU OPTRONICS CORPORATION, Hsin-Chu (TW)

(72) Inventor: Hao-An Chuang, Hsin-Chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 0 days.

(21) Appl. No.: 14/946,906

(22) Filed: Nov. 20, 2015

(65) Prior Publication Data

US 2016/0191844 A1    Jun. 30, 2016

(30) Foreign Application Priority Data

Dec. 30, 2014    (TW) .............................. 103146345 A

(51) Int. Cl.
   - *H04N 5/655* (2006.01)
   - *H04N 5/64* (2006.01)
   - *G02F 1/1333* (2006.01)
   - *G06F 1/16* (2006.01)

(52) U.S. Cl.
   CPC .............. *H04N 5/64* (2013.01); *G02F 1/1333* (2013.01); *G06F 1/16* (2013.01)

(58) Field of Classification Search
   USPC ................................................. 348/836, 739
   See application file for complete search history.

(56) References Cited

U.S. PATENT DOCUMENTS

| | | | | |
|---|---|---|---|---|
| 5,307,581 A * | 5/1994 | Kalmykow | ............... | G09F 7/08 40/585 |
| 5,735,708 A * | 4/1998 | Arnett | .................. | H05K 5/0252 174/66 |
| 8,471,985 B2 | 6/2013 | Hsu et al. | | |
| 8,934,226 B2 * | 1/2015 | Smith | .................. | G06F 1/1613 361/679.2 |
| 2006/0170844 A1 * | 8/2006 | Yuuki | ................... | G02F 1/1336 349/114 |
| 2007/0046852 A1 * | 3/2007 | Kim | .................. | G02F 1/133608 349/58 |
| 2010/0141567 A1 * | 6/2010 | Chen | ....................... | H05K 5/02 345/87 |
| 2011/0267551 A1 * | 11/2011 | Yokote | .................. | G06F 1/1643 348/836 |
| 2012/0281158 A1 | 11/2012 | Chen et al. | | |
| 2013/0057785 A1 * | 3/2013 | Hiratomo | ............ | H04M 1/0202 348/843 |
| 2013/0300618 A1 * | 11/2013 | Yarga | ..................... | H01Q 1/243 343/720 |
| 2014/0104503 A1 * | 4/2014 | Takao | .................... | F16M 11/08 348/836 |

FOREIGN PATENT DOCUMENTS

| | | |
|---|---|---|
| CN | 101551539 B | 10/2009 |
| CN | 103439819 A | 12/2013 |
| JP | 2010060883 A | 3/2010 |
| TW | 201227059 A1 | 7/2012 |
| TW | 201245805 | 11/2012 |

OTHER PUBLICATIONS

Office Action issued in corresponding Taiwan patent application on Aug. 22, 2016.

* cited by examiner

*Primary Examiner* — Paulos M Natnael
(74) *Attorney, Agent, or Firm* — McClure, Qualey & Rodack, LLP

(57) ABSTRACT

A display module having strengthened structure is provided. The display module includes a display panel and a transparent cover. The display panel has a display face and includes a circuit area. The circuit area is disposed close to a first side of the display panel. The transparent cover is attached to the display face and has a first edge corresponding to the first side, wherein the first edge extends beyond the first side. The transparent cover comprises a first recessed area, and the first recessed area shrinks from the first edge toward a center of the transparent cover. An edge of the first recessed area retreats behind the first side and exposes the circuit area.

13 Claims, 13 Drawing Sheets

DISPLAY MODULE HAVING STRENGTHENED STRUCTURE

BACKGROUND OF THE INVENTION

1. Field of the Invention

The present invention generally relates to a display module of strengthening design. Particularly, the present invention relates to a display module having a strengthened structure of transparent cover.

2. Description of the Prior Art

For display device, the display module thereof can further have a transparent cover in addition to the display panel so that the display module has functions such as 3D displaying, touchscreen, scratch-resistant, impact-resistant, glare-resistant, and reflection-resistant. Generally, the transparent cover may be attached to the polarizer of the display panel with the optical glue by full lamination process. The transparent cover may be disposed on the display panel to cover or not to cover the circuit area. However, in the case that the circuit area is covered by the transparent cover, if the rework or repair process is required on the circuit area, the transparent cover must be separated from the display panel first and then clean the optical glue and residues thereof thoroughly. Such procedures are time-consuming and may result in damage to the display panel.

On the other hand, as shown in FIG. 1, the transparent cover 80 may be disposed on the display panel without covering the circuit area 91, wherein the edge of the display panel 90 protrudes outward with respect to the edge of the transparent cover 80. When the display module 9 is transported in an upright status, the display panel 90 is supported by and contacts the frame 70 so that it is easily damaged due to vibrations during transportation. Further, when the display module 9 is in upright status, the transparent cover 80 is not supported in a direction against the gravity; the transparent cover 80 is disposed in the display module 9 by the optical glue 90, wherein only the optical glue 60 bears the transparent cover 80 and the weight thereof when in the upright status. As a result, if adhesion force of the optical glue 90 is weaken due to environmental factors such as humidity and temperature, the transparent cover 80 may move relative to the display panel 90 and result in Mura or other optical defects.

SUMMARY OF THE INVENTION

It is an object of the present invention to provide a display module having a strengthened structure and a better display quality.

It is another object of the present invention to provide a display module which is easy for repair and rework and therefore reduce working hours.

The display module of the present invention includes a display panel and a transparent cover. The display panel has a display face and includes a circuit area, wherein the circuit area is located close to a first side of the display panel. The transparent cover is attached to the display face and has a first edge corresponding to the first side of the display panel and protruding beyond the first side. The transparent cover comprises a first recessed area, and the first recessed area shrinks from the first edge toward a center of the transparent cover. An edge of the first recessed area retreats behind the first side and exposes the circuit area.

Accordingly, the display module of the present invention has a transparent cover protruding beyond the display panel.

With such a design that the transparent cover extends out of a rim of the display module, the structural strength of the display module can be improved; in other words, the rim and border of the display module are prevented from contact or impact due to the transparent cover. On the other hand, the transparent cover does not cover the circuit area, which is exposed in the first recessed area. As a result, the repair or rework process required on the circuit in the circuit area can be easily done; the working hours for such processes is accordingly reduced; moreover, the chance of the display panel affected by such processes is also decreased. In sum, the display module of the present invention is maintained in the best condition due to the strengthening design.

DETAILED DESCRIPTION OF THE PREFERRED EMBODIMENT

Figure 1:
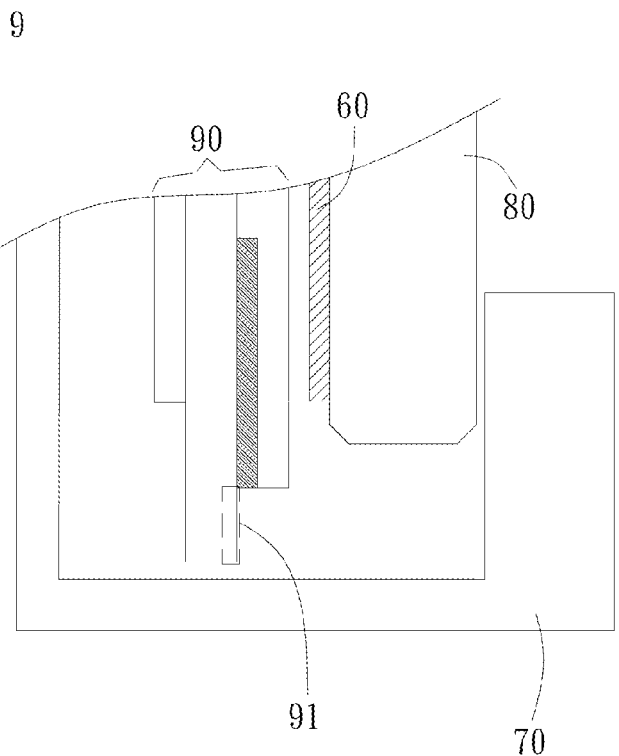
FIG. 1 shows a schematic view of the conventional display module.
Figure 2:
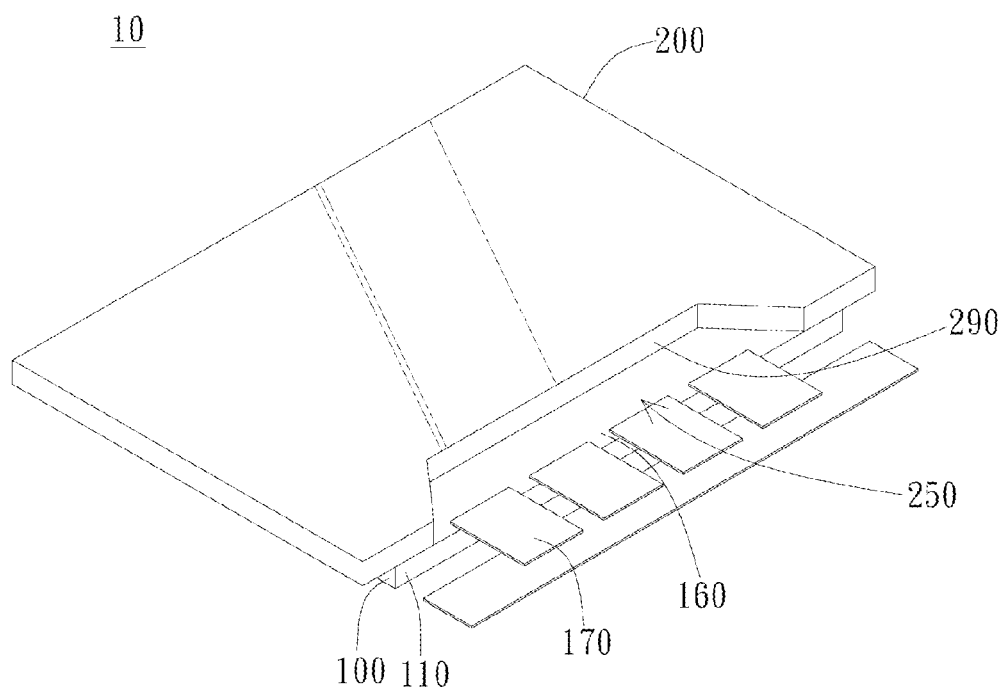
FIG. 2 is a three-dimensional view of an embodiment of the display module of the present invention.
Figure 3:
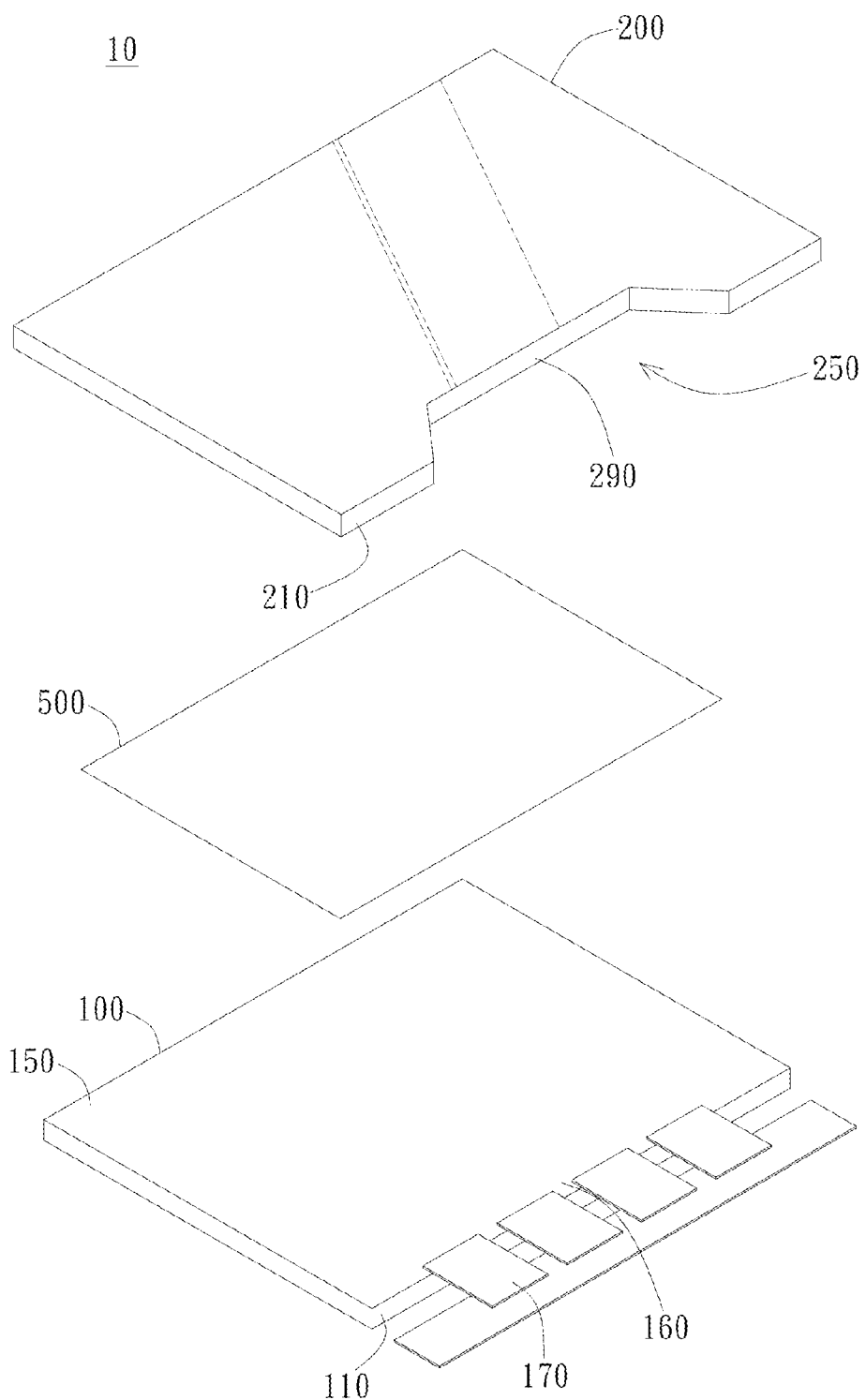
FIG. 3 is an exploded view of FIG. 2.

FIG. 2 and FIG. 3 show the three-dimensional view and the exploded view of the display module of the present invention, respectively. As shown in FIG. 2 and FIG. 3, the display module of the present invention includes a display panel 100 and a transparent cover 200. The display panel 100 has a display face 150; in the preferred embodiment, the display panel 100 may further include a polarizer disposed on the display face 150. The display panel 100 also includes a circuit area 160, which is preferably adjacent to a first side 110 of the display panel 100 for connection with various circuits such as a drive circuit 170. In the embodiment, the circuit area 160 is disposed on the display face 150; in other embodiments, the circuit area 160 is disposed closed the display face 150. In one embodiment of the present invention, the drive circuit 170 is disposed on the circuit area 160 by means of Chip of Film (COF); in other embodiments, the drive circuit 170 may be disposed on the circuit area 160 by means of Chip on Glass (COG).

In addition to disposition of circuits and the drive circuit 170, the circuit area 160 further serves as a working area for applying tools or materials to the display panel 100. For example, the circuit area 160 preferably has sufficient space for disposition of the Anisotropic Conductive Film (ACF) on the display face 150, wherein in one embodiment of the present invention, the disposition of ACF on the display face 150 requires a space area, which may substantially be the circuit area 160. On the other hand, the disposition of the drive circuit 170 on the circuit area 160 is through apparatus such as a buffer sheet and a bonding head, which press-bond the drive circuit 170 (or a chip) onto the display panel 100. It is preferably that the circuit area 160 has sufficient space for such operations.

The transparent cover 200 is directly or indirectly attached to the display face 150 and has a first edge 210 corresponding to the first side 110, wherein the first edge 210 extends beyond the first side 110. Material of the transparent cover 200 may be glass such as physically or chemically strengthened glass, transparent optical plastic substrate, or sapphire substrate. The transparent cover 200 may be attached to the display panel 100 by means of an adhesive layer 500. Generally speaking, the transparent cover 200 provides protection effect; in addition, the transparent cover 200 may be or include a patterned phase retarder layer/glass for three-dimensional display device, switching lenticular lens layer (with switching cell) for LCD panel, switchable 3D grating or touch sensor substrate. In one embodiment of the present invention, the transparent cover 200 has a thickness of 2-5 millimeter.

In addition, the transparent cover 200 may be attached to the polarizer disposed on the display face 150 through optical glue. Preferably, the adhesive layer 500 includes optical glue having high refraction index and adheres the transparent cover 200 to the display panel 100 by full lamination process.

In addition, the transparent cover 200 exposes the circuit area 160 which is close to the first side 110 of the display panel 100. Please referring FIG. 3 to FIG. 4 together, the transparent cover 200 comprises a first recessed area 250, the first recessed area 250 shrinks from the first edge 210 toward a center of the transparent cover 200. In other words, the transparent cover 200 recesses from the first edge 210 toward a center of the transparent cover 200 to form a first recessed area 250. The first recessed area 250 is preferably located at a middle section of the first edge 210. Two sides of the first edge 210 protrude outwards with respect to the first recessed area 250. Particularly, the first recessed area 250 is substantially a geometric area such as rectangle, trapezoid, or semi-ellipse, but not limited thereto. The border or corner of the geometric area may be modified to constitute an irregularly-shaped recessed area. An edge 290 of the recessed area may be formed non-linear, wherein the edge 290 of the first recessed area 250 may be a portion of an outer edge of the transparent cover 200 and is connected to the first edge 210.

Since the edge of the transparent cover 200 protrudes with respect to the display panel (i.e. the first edge 210 extends beyond the first side 110), the transparent cover 200 protects the display panel 100 from direct impact. On the other hand, since the transparent cover 200 exposes the circuit area (i.e. the circuit area 160 close to the first side 110 of the display panel 100 is exposed through the first recessed area 250), the rework or repair process performed on the circuit of the display module 10 of the present invention can be proceeded without separating the transparent cover 200 and the display panel 100. Further, the recessed area (e.g. the first recessed area 250) of the transparent cover 200 creates a space for disposition of functional components, such as speaker and control interface, or decorative elements. In addition, the thickness of the transparent cover 200 may be advantageous to the edge-processing so as to embellish the display device. On the other hand, the shape of the recessed area of the transparent cover 200 may cooperate with the border or the frame of the display module so as to constitute an advanced designed display device different from the conventional display device.

Figure 4:
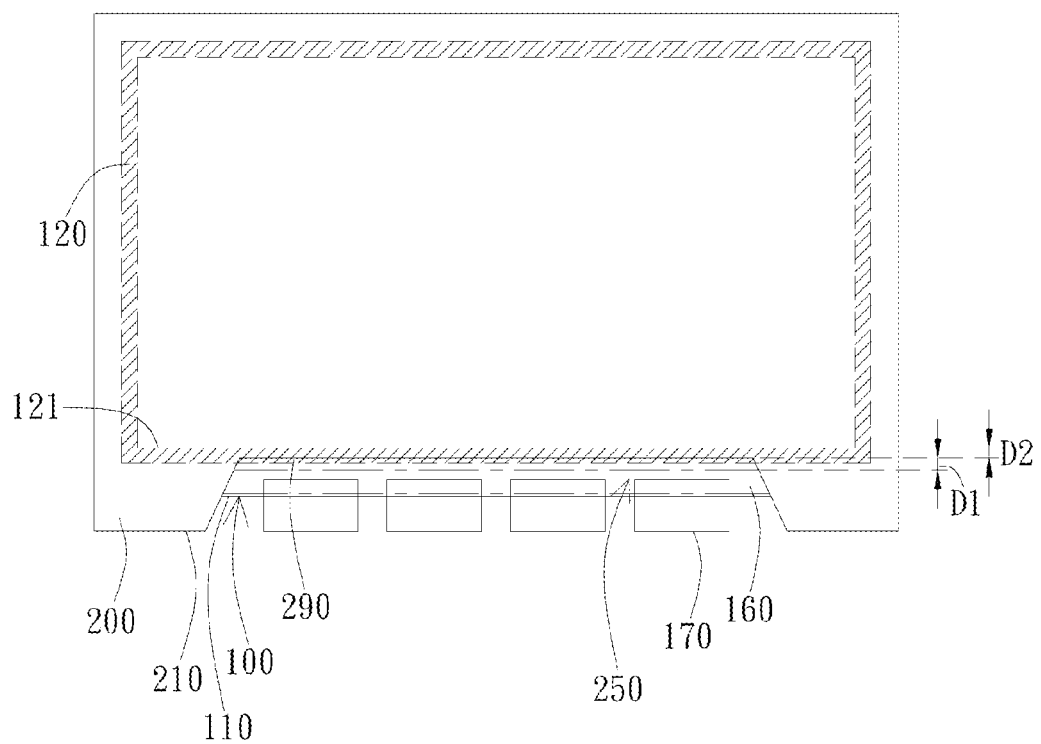
FIG. 4 is a top view of the embodiment shown in FIG. 2.

As FIG. 4 shows, the edge 290 of the first recessed area 250, which is a portion of the outer edge of the transparent cover 200, at least partially retreats behind the first side 110 and exposes the circuit area 160. Two sides of the first edge 210 protrude outward beyond the first side 110. In other words, between the edge 290 of the first recessed area 250 and the first side 110 of the display panel 100 is an area serving as the circuit area 160 or including the circuit area 160. In the preferred embodiment of the present invention, the area between the edge 290 of the first recessed area 250 and the first side 110 of the display panel 100 has a width greater than 400 micrometer. Preferably, the edge 290 of the first recessed area 250 is at least partially parallel to the first side 110, wherein the distance between that part of the edge 290 and the first side 110 of the display panel 100 is greater than 400 micrometer. More preferably, the shortest distance between an inner side of the circuit area 160 and the edge 290 of the first recessed area 250, i.e. "D1", is not less than 400 micrometer. Through such design, the circuit area 160 provides enough space for disposition of the ACF on the display face 150 and/or for the press-bonding process of the drive circuit 170. Furthermore, the circuit area 160 provides sufficient space for the press-bonding process and prevents the butter element from squeezing the transparent cover 200, e.g. squeezing the edge 290 thereof during the press-bonding process. The sufficient space on the circuit area 160 also prevents temperature of the bonding head from influencing the transparent cover 200 and the adhesive layer 500.

In the preferred embodiment of the present invention, the display panel 100 includes a shielding layer 120. For example, the shielding layer 120 is a black matrix layer. In addition, as shown in FIG. 4, the shortest distance between the edge 290 of the first recessed area 250 of the transparent cover 200 and an inner side 121 of the shielding layer 120 facing the inner side of the display panel 100, i.e. "D2", is not less than 500 micrometer. As shown in FIG. 4, the shielding layer 120, which is located within the display panel 100 and covered by the transparent cover 200, is illustrated by a dotted line. In the preferred embodiment of the present invention, the shielding layer 120 has a width not less than 500 micrometer, wherein the projection of the edge of the first recessed area 250 preferably falls on the shielding layer 120. Determinations of the distances D1 and D2 are based on the manufacturing tolerance of cutting and processing the transparent cover, alignment between the transparent cover and the display panel (and the possible error thereof), disposition of the circuit and operation space for the tool or the material. By controlling the distances D1 and D2 to be within the range mentioned above, it can ensure that the edge 290 of the first recessed area 250 is located in a proper area without interfering with display quality of the display module 10.

Figure 5:
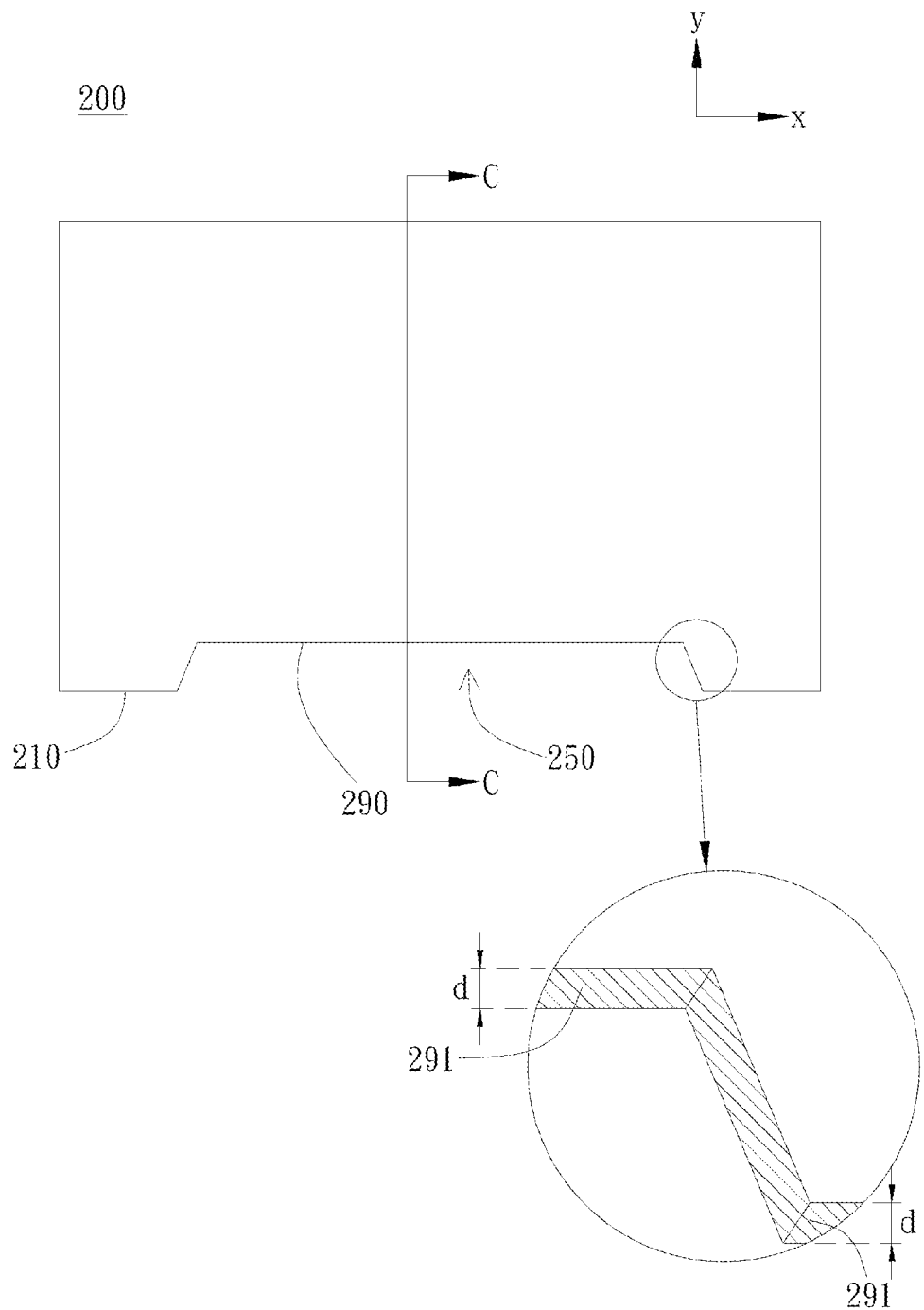
FIG. 5 is a top view of a transparent cover in an embodiment of the present invention.
Figure 6:
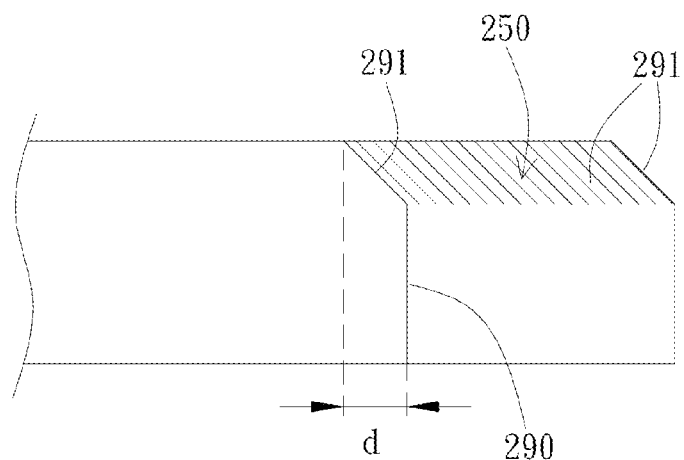
FIG. 6 is a cross-sectional view of FIG. 5 along the CC cross-sectional line.

On the other hand, the edge 290 of the recessed area may be treated with edge beveling, as the partially enlarged view shown in FIG. 5 and its cross-sectional view shown in FIG. 6. The edge 290 treated with beveling may serve as a base line for alignment of the transparent cover 200. The beveled edge 290 specifically includes an inclined face 291. The inclined face 291 has a horizontal width d substantial parallel to a surface of the transparent cover 200, wherein a direction of the horizontal width d is a direction component of a dip direction of the inclined face 291, wherein the direction component is substantially perpendicular to the edge 290, i.e. perpendicular to an extending direction of the edge 290. In the preferred embodiment of the present invention, the horizontal width d of the inclined face 291 is 200-500 μm.

In other embodiments, the transparent cover 200 may include a plurality of recessed areas. As the embodiment shown in FIG. 7A, the transparent cover 200a has a first edge 210, a second edge 220, and a third edge 230, wherein the transparent cover 200a respectively recesses from the first edge 210, the second edge 220, and the third edge 230 toward a center of the transparent cover 200a to form a first recessed area 250, a second recessed area 260, and a third recessed area 270. In an embodiment that the transparent cover 200a is rectangular, the first edge 210 can be adjacent to the second edge 220 and the third edge 230, respectively, wherein the second edge 220 and the third edge 230 are two opposite edges on the rectangular transparent cover. The first recessed area 250, the second recessed area 260, and the third recessed area 270 are located at a middle section of the first edge 210, a middle section of the second edge 220, and a middle section of the third edge 230, respectively. As the embodiment shown in FIG. 7B, the transparent cover 200b further recesses from the fourth edge 240 toward the center of the transparent cover 200b to form the fourth recessed area 280; in an embodiment that the transparent cover 200b is rectangular, the second recessed area 260 and the third recessed area 270 are formed respectively at two opposite short sides of the transparent covers 200b; the first recessed area 250 and the fourth recessed area 280 area formed respectively at two opposite long sides of the transparent cover 200b. The edge 290 of the recessed area may be formed non-linear. As the transparent cover 200c shown in FIG. 7C, the two opposite recessed areas 250 and 280 have the edge 290 smoothly curved.

Figure 7A:
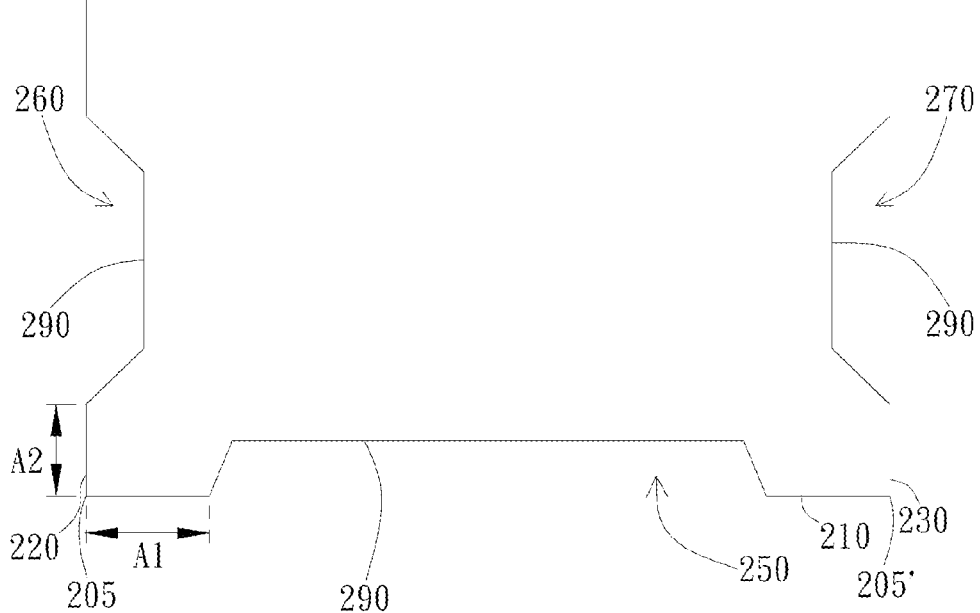
FIGS. 7A-7D are top views of the transparent cover in other embodiments of the present invention.

Please refer to FIG. 7A, wherein the first edge 210 and the second edge 220 are adjacent. As mentioned above, the first recessed area 250 and the second recessed area 260 are respectively located at the middle section of the first edge 210 and the middle section of the second edge 220. Accordingly, the corner portion of the transparent cover 200a is not recessed. That is, one end of the first edge 210 is connected to one end of the second edge 220 to form a corner area 205, wherein the corner area 205 of the transparent cover 200a protrudes with respect to two sides (one side is the middle section of the first edge 210 and the other side is the middle section of the second edge 220). In other words, the first edge 210 is connected to the second edge 220 to form the corner area 205. Following the principle, the first edge 210 is connected to the third edge 230 of the transparent cover 200a as well to form the corner area 205'.

Figure 7B:
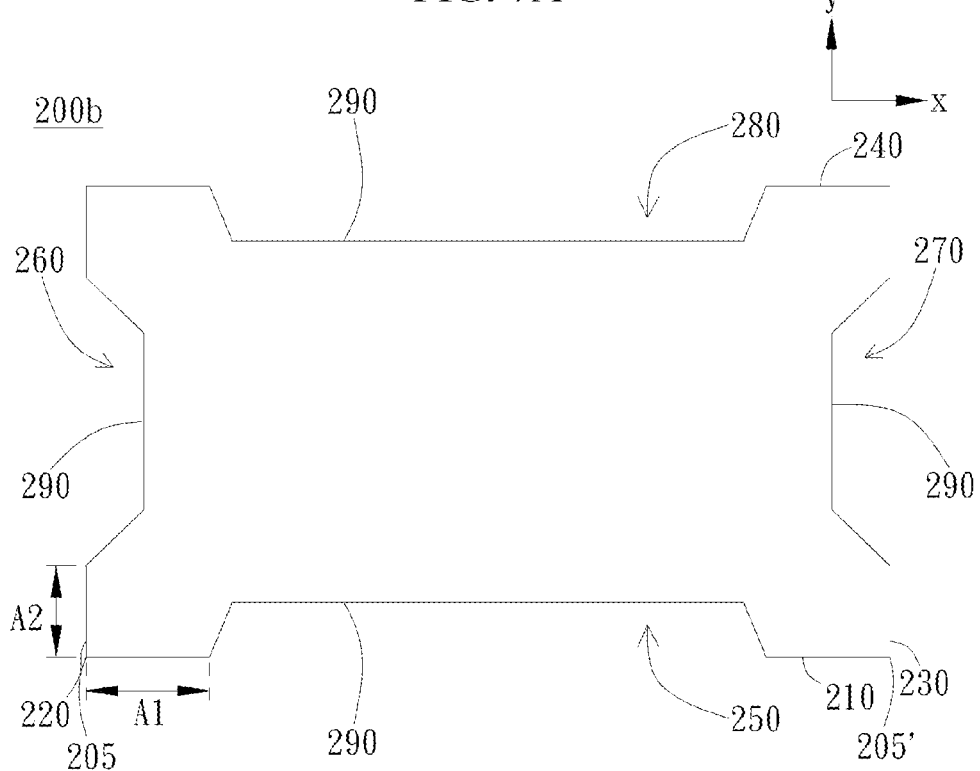
Figure 7C:
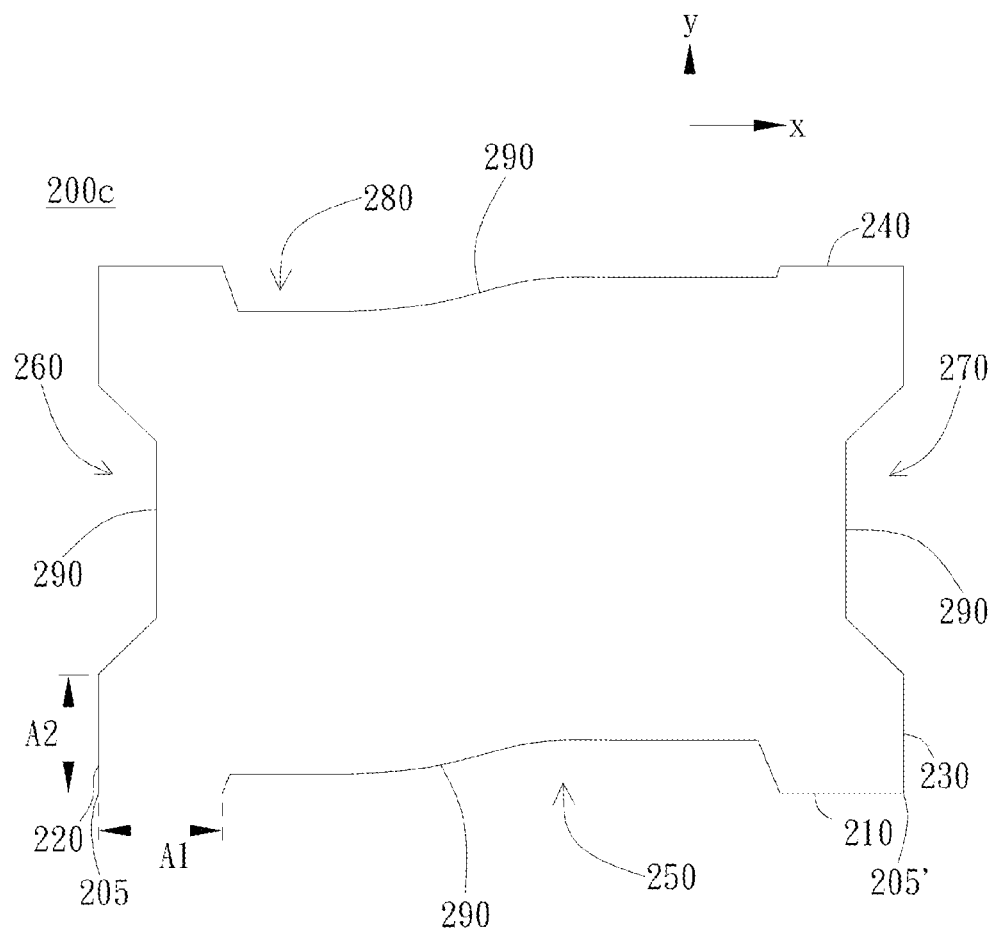

The display panel may be designed in accordance with the transparent cover shown in FIGS. 7A-7C. For example, in addition to the first side 110, one or more circuit areas are further disposed close to other sides such as the second side, the third side, and the fourth side. Please refer to FIG. 7A; when the transparent cover 200a is attached to the display face 150 of the display panel 100, the first recessed area 250, the second recessed area 260, and the third recessed area 270 expose the circuit areas which is close to the first side, the second side, and the third side, respectively, wherein the second side and the third side may be two opposite sides connected to the first side 110. Please refer to FIG. 7B; when the transparent cover 200b is attached to the display face 150 of the display panel 100, the first recessed area 250, the second recessed area 260, the third recessed area 270, and the fourth recessed area 280 expose the circuit areas which are close to the first side, the second side, the third side, and the fourth side, respectively.

In addition, the transparent cover as shown in FIGS. 7A-7C, the edge 290 of the recessed area may be treated with edge beveling to form an inclined face, as described above; the edge 290 treated with beveling may serve as a base line for alignment of the transparent cover 200.

Figure 7D:
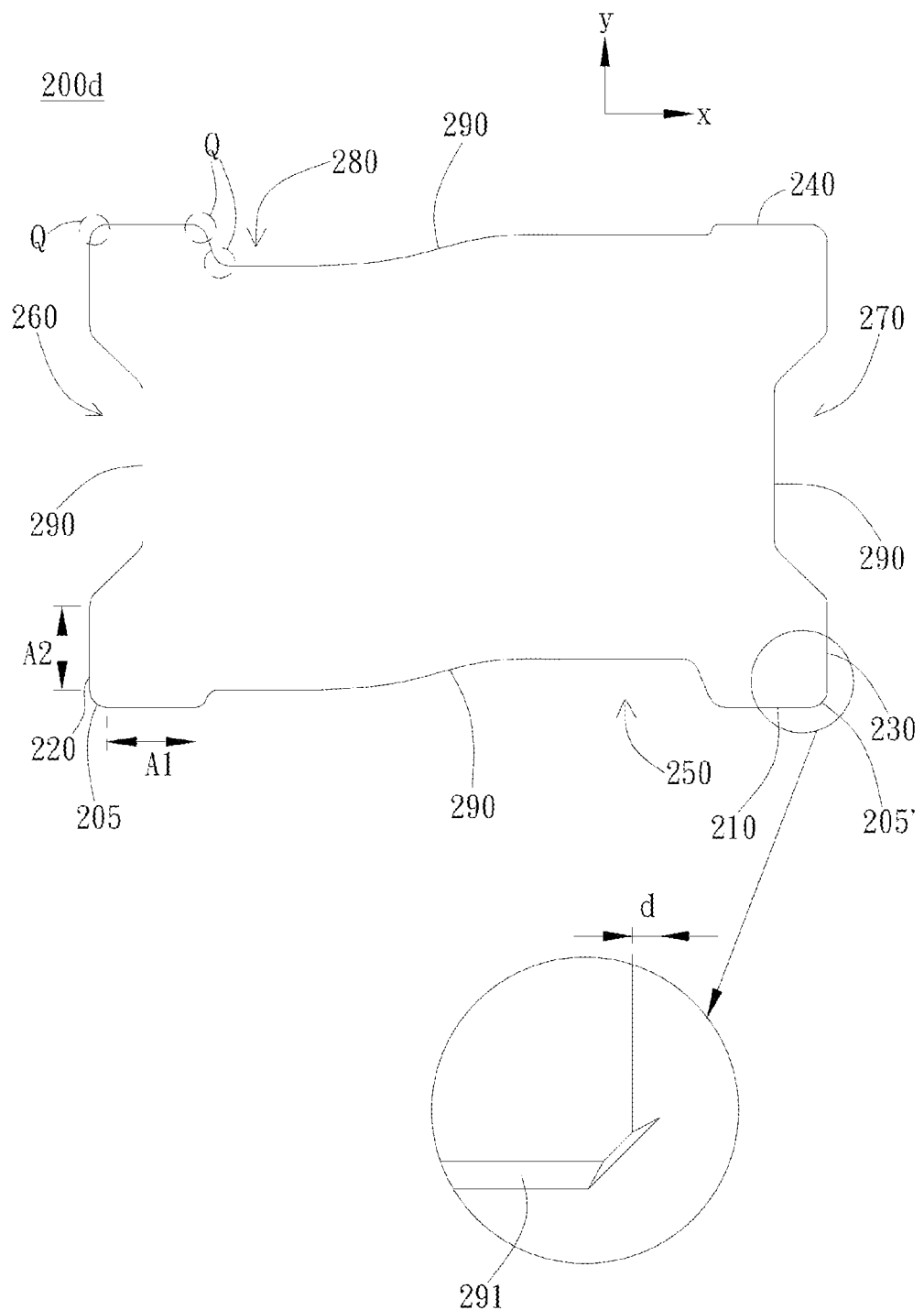

On the other hand, other portions of the transparent cover without the recessed area may be at least partially treated with edge beveling to form the inclined face 291; in other words, a portion of the edge of the transparent cover without disposing the recessed area can also be treated with edge beveling. Please refer to FIG. 7D; the portion of the edge of the transparent cover 200d at corner, i.e. the portion of the first edge 210, the second edge 220, the third edge 230 and/or the fourth edge 240 at corners may be treated with edge beveling to form the inclined face 291. In the preferred embodiment of the present invention, the inclined face 291 has the horizontal width d, which together with the first edge 210 and the second edge 220, or with the first edge 210 and the third edge 230 serve as the base line for alignment of the transparent cover 200d. For example, during the full lamination process, the inclined face 291 having the horizontal width d can cooperate with alignment mechanism and serve as the base line for the alignment between the transparent cover 200d and the display panel 100 so as to assure a distance between the transparent cover 200d and the circuit area 160 of the display panel 100 and a location of the transparent cover 200d relative to the frame of the display module 10.

On the other hand, the portion of the edge of the transparent cover 200d located at the corner preferably has a length A1 in the x direction and a length A2 in the y direction so as to make the edge recognizable as well as to provide a reference for alignment, but is not limited thereto. In addition, the portion of the edge located at the corner may be preferably formed inclined face 291. For example, the portion of the first edge 210 at the corner has the length A1; the portion of the second edge 220 at the corner has the length A2, wherein the first edge 210 and the second edge 220 are adjacent and connected to each other at the corner but not limited thereto. In the preferred embodiment of the present invention, A1 is greater than 10 mm; A2 is greater than 30 mm. In one embodiment, A1 is greater than 11 mm; A2 is greater than 34 mm. The portion of the edge of the transparent cover 200d located at other corners (e.g. the corners at which the edges except from the first edge 210 and the second edge 220 meet) may have the length A1 in the x direction and the length A2 in the y direction.

In addition, the portion of the first edge 210 of the transparent cover located near the corner area 205 may have the length different that of the portion of the second edge 220 located near the corner area 205. The difference in length together with the inclined face which has the horizontal width d make the edge distinguishable and provide the reference for alignment, wherein depending on the alignment mechanisms such as those for the alignment between the transparent cover 200 and the display panel 100, the lengths may be varied. Corner area 205' may have the features in length as the corner area 205 has. Take the embodiment of transparent cover 200d shown in FIG. 7D for example; the portion of the first edge 210 between the corner area 205 and the first recessed area 250 has the length A1 greater than 10 mm; the portion of the second edge 220 between the corner area 205 and the second recessed area 260 has the length A2 greater than 30 mm. In another embodiment, the portion of the first edge 210 between the corner area 205 and the first recessed area 250 has the length greater than 30 mm while the portion of the second edge 220 between the corner area 205 and the second recessed area 260 has the length greater than 10 mm. In a further other embodiment, A1 is greater than 11 mm; A2 is greater than 34 mm.

In the preferred embodiment of the present invention, any turn, boundary and/or corner along a rim of the transparent cover is preferably rounded. Please refer to FIG. 7D, rounded corners Q are formed at the turn along the edge 290 of the recessed area, at the boundary between the edge 290 of the recessed area and the edge 210, 220, 230 and/or 240, and/or corner, which reduces concentration of stress.

Figure 8:
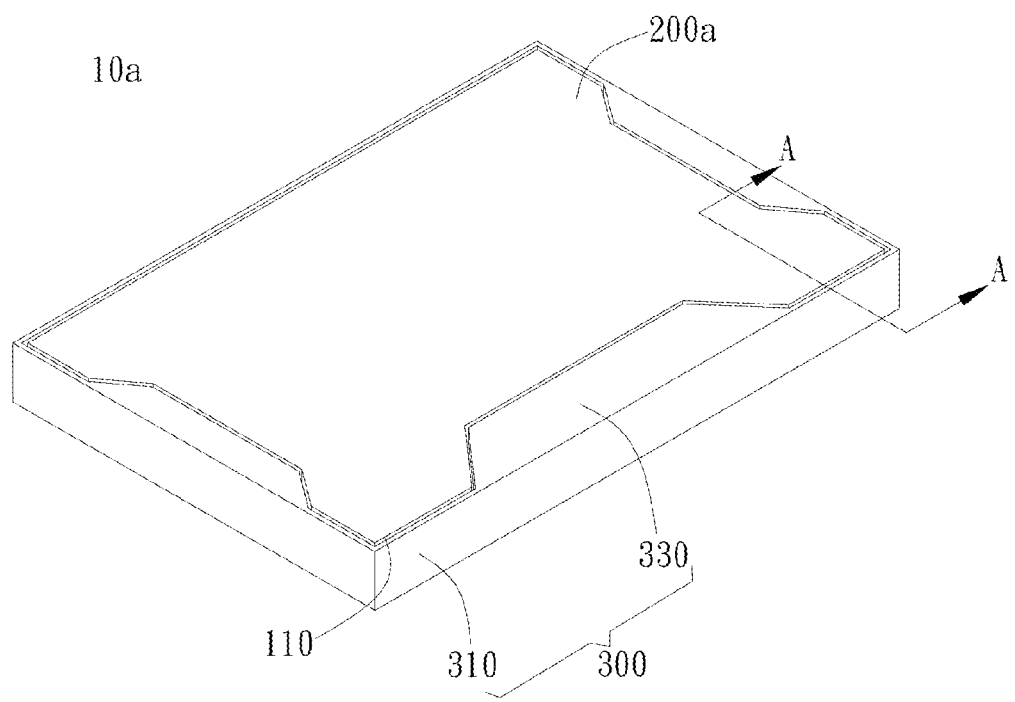
FIG. 8 is a three-dimensional view of another embodiment of the display module of the present invention.
Figure 9:
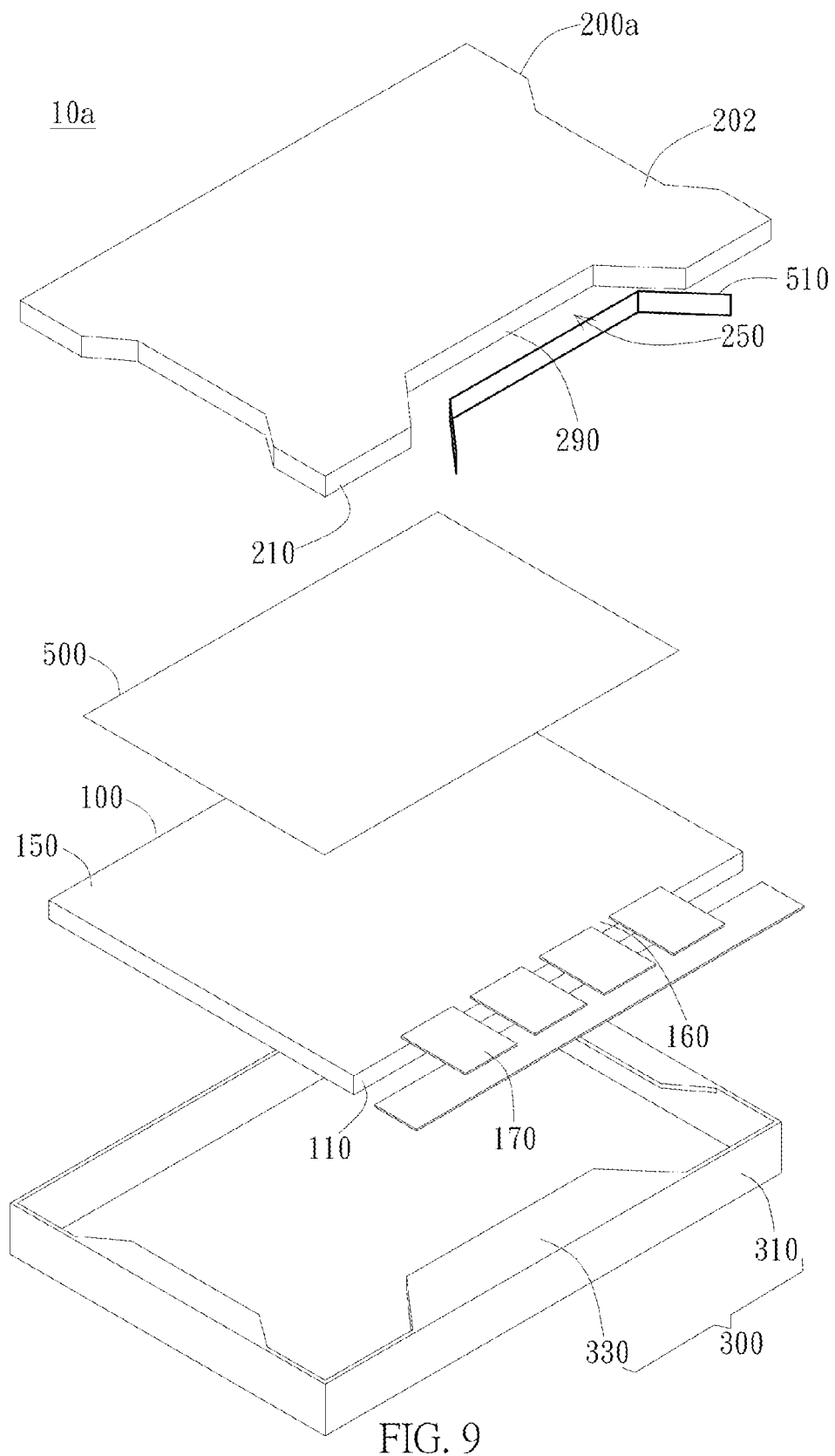
FIG. 9 is an exploded view of FIG. 8.

As shown in FIGS. 8 and 9, the display module of the present invention further includes a frame 300. The frame 300 accommodates the display panel 100 and the transparent cover 200a. The frame 300 has a sidewall 310 corresponding to the first side 110 of the display panel 100 and the first edge 210 of the transparent cover 200a. In addition, the frame 300 may cover a portion of the transparent cover 200a or be coplanar with the transparent cover 200a; alternatively, the transparent cover 200a may be disposed higher than the frame 300.

The frame 300 further includes an upper plate 330. As shown in FIG. 9, the upper plate 330 extends from a top end of the sidewall 310 toward the center of the transparent cover 200a to be embedded in the first recessed area 250. In other words, the transparent cover 200a recesses from the first edge 210 to form the first recessed area 250 while the upper plate 330 extends from the top end of the sidewall 310 toward to the transparent cover 200 and therefore is complementary to the first recessed area 250. The shape of the first recessed area 250 corresponds to the shape of the upper plate 330; in addition, an outer edge of the upper plate 330 faces the edge 290 of the first recessed area 250. The upper plate 330 may be further connected to the edge 290 such as contacting the edge 290; alternatively, the outer edge of the upper plate 330 may be separated from the edge 290 by a gap. The gap may be filled with such as adhesive filling material 510 or buffering material.

Figure 10:
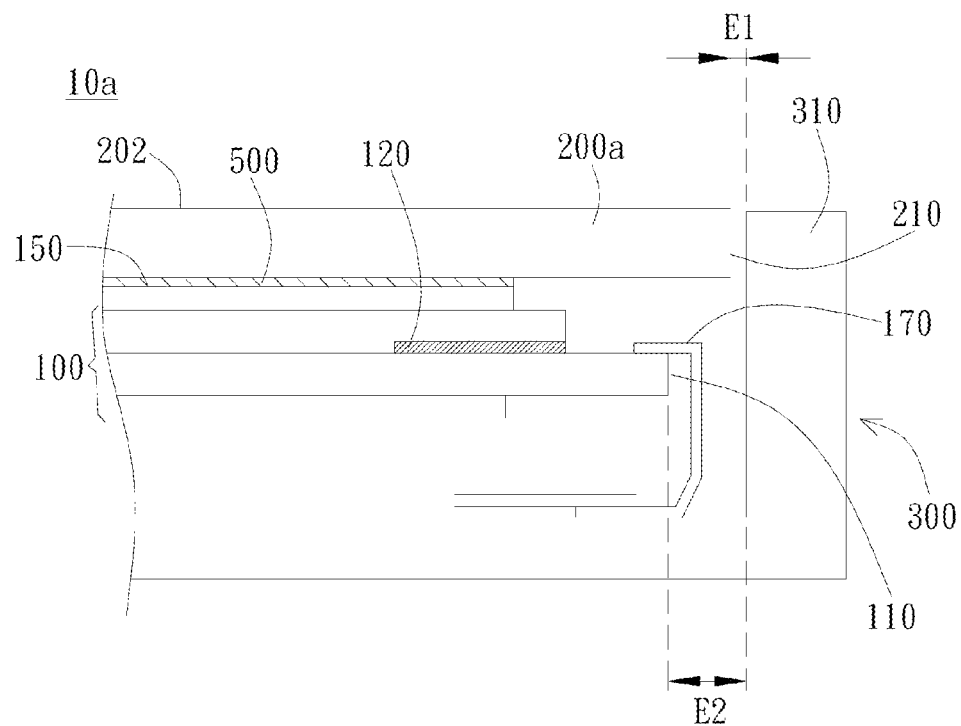
FIG. 10 is a cross-sectional view of FIG. 8 along the AA line.

As mentioned above, the frame 300 has a sidewall 310 corresponding to the first side 110 of the display panel 100 and the first edge 210 of the transparent cover 200a, wherein as shown in FIG. 10, a section of the first edge 210 without disposing the first recessed area 250 is closer to the sidewall 310 than the first side 110. In other words, the distance E1 is smaller than the distance E2. In addition, in the present embodiment, the upper plate 330 which extends from the top end of the sidewall 310 toward the center of the transparent cover 200a and is embedded in the first recessed area 250 is substantially located at the same level with the outer surface 202 of the transparent cover 200a. That is, the upper plate 330 is preferably coplanar with the outer surface 202 of the transparent cover 200a.

Figure 11:
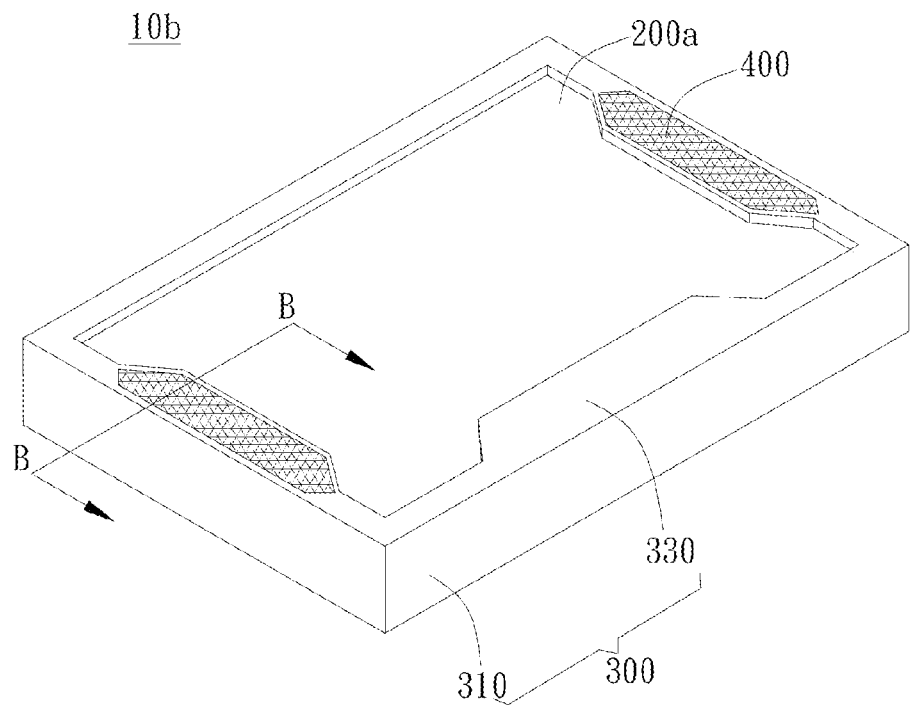
FIG. 11 is a three-dimensional view of another embodiment of the display module of the present invention.
Figure 12:
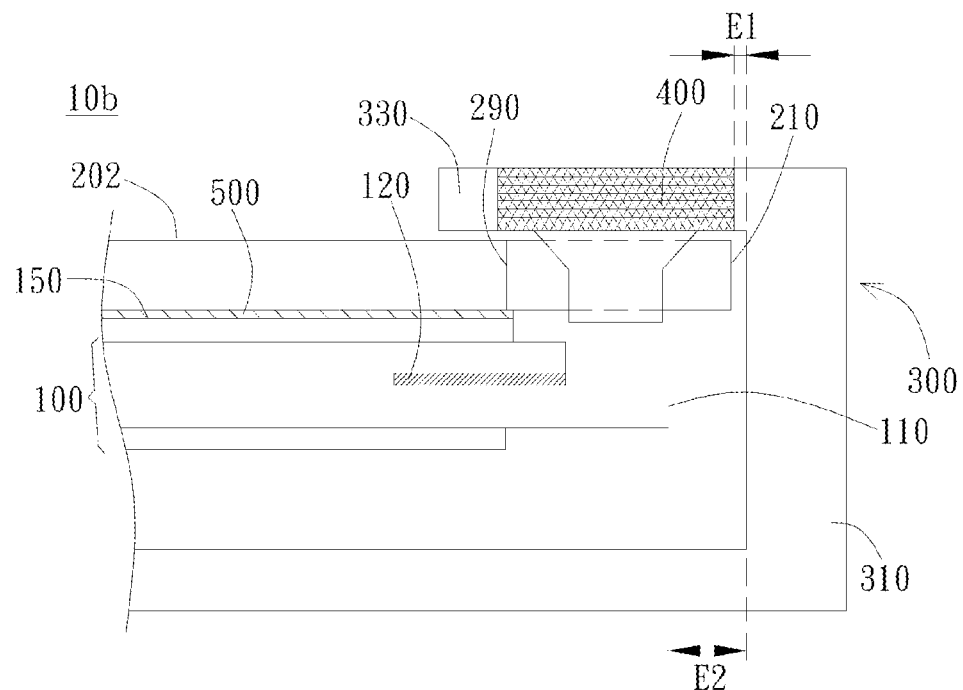
FIG. 12 is a three-dimensional view of FIG. 11 along the BB line.

FIGS. 11 and 12 show another embodiment of the display module of the present invention. The display module 10b includes the frame 300 which accommodates the display panel 100 and the transparent cover 200a. The frame 300 has the sidewall 310 corresponding to the first side 110 of the display panel 100 and the first edge 210 of the transparent cover 200a. A section of the first edge 210 without disposing the recessed area is closer to the sidewall 310 than the first side 110, i.e. the distance E1 is smaller than the distance E2. In addition, the sidewall 310 extends in a direction consistent with the displaying direction as well as passing the first edge 210 of the transparent cover 200a. The first edge 210 substantially faces the sidewall 310.

The frame 300 further includes the upper plate 330. Different from the above embodiment, the upper plate 330 extends from a top end of the sidewall 310 toward the center of the transparent cover 200a and is located above the edge 290;

the first recessed area 250 is positioned between the display face 150 and the upper plate 330 and creates a space below the upper plate 330. In another embodiment, the transparent cover 200a may be higher than the frame 300 and, for example, supported by the sidewall 310.

The display module 10 further has functional components 400 such as speaker or control interface disposed at the frame 300. For example, the functional components are disposed on the upper plate 330. In the embodiment of display module 10b, the functional components may further extend into the space below the upper plate 330, i.e. the first recessed area 250, wherein the functional components may be connected to inner components (compared to the components disposed on the frame 300) of the display module 10b through the space.

Although the preferred embodiments of present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A display module, including:
    a display panel having a display face, wherein the display panel includes a circuit area located close to a first side of the display panel; and
    a transparent cover attached to the display face, the transparent cover having a first edge corresponding to the first side and protruding beyond the first side,
    wherein the transparent cover comprises a first recessed area, the first recessed area shrinks from the first edge toward a center of the transparent cover, and an edge of the first recessed area retreats behind the first side and exposes the circuit area.

2. The display module of claim 1, wherein the first recessed area is located at a middle section of the first edge, and two sides of the first edge protrude outward with respect to the first recessed area.

3. The display module of claim 1, wherein a shortest distance between the edge of the first recessed area and the circuit area is not less than 400 μm.

4. The display module of claim 1, wherein the display panel has a shielding layer at the first side, and a shortest distance from the edge of the first recessed area to an inner edge of the shielding layer facing an interior of the display panel is not less than 500 μm.

5. The display module of claim 1, further including a frame for accommodating the display panel and the transparent cover, wherein the frame has a sidewall corresponding to the first side and the first edge, a section of the first edge without disposing the first recessed area is closer to the sidewall than the first side.

6. The display module of claim 5, wherein the frame includes:
    an upper plate extending from a top end of the sidewall toward the center of the transparent cover to the edge of the first recessed area, so that the recessed area is positioned between the display face and the upper plate; and at least one functional component disposed on the upper plate and entering a space in the recessed area.

7. The display module of claim 5, wherein the frame includes an upper plate extending from a top end of the sidewall toward the center of the transparent cover to be embedded in the first recessed area.

8. The display module of claim 7, wherein the upper plate is connected directly or indirectly to the edge of the first recessed area.

9. The display module of claim 1, wherein the edge of the first recessed area is nonlinear.

10. The display module of claim 1, wherein a section of the first edge without disposing the first recessed area is partially formed an inclined face.

11. The display module of claim 1, wherein the transparent cover has a second edge, the second edge is connected to the first edge to form a corner area and protrudes beyond a corresponding side of the display panel, the transparent cover further comprises a second recessed area , and the second recessed area shrinks from the second edge toward the center of the transparent cover; wherein a length of a part of the first edge between the corner area and the first recessed area is greater than 10 mm and a length of a part of the second edge between the corner area and the second recessed area is greater than 30 mm.

12. The display module of claim 1, wherein the transparent cover has a second edge, the second edge is connected to the first edge to form a corner area and protrudes beyond a corresponding side of the display panel, the transparent cover further comprises a second recessed area , and the second recessed area shrinks from the second edge toward the center of the transparent cover; wherein a length of a part of the first edge between the corner area and the first recessed area is greater than 30 mm; a length of a part of the second edge between the corner area and the second recessed area is greater than 10 mm.

13. The display module of claim 1, wherein at least one turn along the edge of the first recessed area is rounded.

* * * * *